United States Patent [19]

Murray, Jr. et al.

[11] Patent Number: 4,777,085

[45] Date of Patent: Oct. 11, 1988

[54] MULTIPLE LAYER SHEET MATERIAL

[75] Inventors: Lee J. Murray, Jr., Appleton; Suzanne E. Schaefer, Neenah, both of Wis.

[73] Assignee: American National Can Company, Chicago, Ill.

[21] Appl. No.: 687,202

[22] Filed: Dec. 28, 1984

[51] Int. Cl.⁴ .................................................. C09J 7/02
[52] U.S. Cl. ...................................... 428/353; 428/35; 428/344; 428/349; 428/516; 428/461; 428/463
[58] Field of Search ............... 428/344, 347, 353, 516, 428/35, 461, 463, 349; 206/484

[56] References Cited

U.S. PATENT DOCUMENTS

| | | | |
|---|---|---|---|
| 2,953,475 | 9/1960 | Bergstedt et al. | 428/353 |
| 3,111,418 | 11/1963 | Gilbert et al. | 428/353 |
| 3,340,088 | 9/1967 | Pennisi et al. | 428/353 |
| 3,471,359 | 10/1969 | Goldstein | 428/353 |
| 3,976,224 | 8/1976 | Ericson et al. | 222/107 |
| 4,096,309 | 6/1978 | Stillman | 428/461 |
| 4,190,477 | 2/1980 | Ossian et al. | 428/461 |
| 4,257,536 | 3/1981 | Hilmar | 222/107 |
| 4,284,672 | 8/1981 | Stillman | 428/35 |
| 4,308,084 | 12/1981 | Ohtusuki et al. | 428/461 |
| 4,311,742 | 1/1982 | Otsuka | 428/461 |
| 4,360,550 | 11/1982 | Asakura et al. | 428/35 |
| 4,387,126 | 6/1983 | Rebbolz | 428/463 |
| 4,418,841 | 12/1983 | Eckstein | 222/107 |
| 4,424,256 | 1/1984 | Christensen et al. | 428/35 |
| 4,564,558 | 1/1986 | Touhsaent et al. | 428/35 |
| 4,568,000 | 2/1986 | Middleton | 428/35 |
| 4,578,294 | 3/1986 | Ouchi et al. | 428/35 |
| 4,659,408 | 4/1987 | Redding | 156/244.11 |

FOREIGN PATENT DOCUMENTS

| | | |
|---|---|---|
| 62385 | 4/1982 | European Pat. Off. . |
| 1573057 | 1/1977 | United Kingdom . |
| 899829 | 6/1982 | United Kingdom . |

Primary Examiner—Edith Buffalow
Attorney, Agent, or Firm—Paul R. Audet; Thomas D. Wilhelm

[57] ABSTRACT

The invention is in an improved multiple layer packaging sheet material which can be formed into closed and sealed packages suitable for holding products containing substantial fractions of cyanoacrylate. The invention depends on the positioning of high density polyethylene in direct contact with the cyanoacrylate-type product, and positioning a primer on the other side of the high density polyethylene. Preferred embodiments of the sheet structure include additional layers to provide barrier and abuse resistance properties, and the necessary adhesive materials to hold the various layers of the structure together with good adhesion. Additional layers are contemplated. The sheet structure can be formed into a package which positions the high density polyethylene adjacent the cyanoacrylate product, and between it and the other layers at all locations of contact between the cyanoacrylate product and the packaging sheet material.

117 Claims, 4 Drawing Sheets

MULTIPLE LAYER SHEET MATERIAL

BACKGROUND OF THE INVENTION

Products containing cyanoacrylate are quite active chemically. Because of the reactive nature of cyanoacrylates, it has been difficult to find packaging means and materials with which the cyanoacrylate product does not interact in a way which is detrimental to the cyanoacrylate in the package, and to holding it in the package.

Traditionally, cyanoacrylate adhesives have been packaged in plastic bottles and metal tubes. The plastic containers do not provide adequate vapor barrier, such that the shelf life of products packaged in conventional plastic containers is undesirably short. Metal tubes also have some undesirable characteristics. They are relatively inflexible such that they can be flexed only a few times as in repeated dispensing before cracks develop in the tube sidewall. Overall, though, shelf life of cyanoacrylate products is better in metal tubes than in plastic, at least until the tube is initially opened. Nevertheless, the shelf life, even in metal tubes, is less than desired. Clearly, cyanoacrylates are readily identified as being difficult to hold in a package over a desirable shelf life period.

Products have been packaged in tube-type containers of generally three types. The first type is a metal tube. Such tubes provide excellent barrier properties, but have undesirable functional properties as discussed above. The second type is a plastic tube made from either single or multiple layers of plastics. While plastic tubes may be excellent for many products, no plastic packaging materials are known which are excellent for holding cyanoacrylate-type products. The third type is a tube made from previously formed multiple layer sheet materials containing a layer of metal foil and a plurality of layers of plastic materials, generally referred to hereinafter as laminated tubes.

The third type of tube container has been used conventionally for holding hygienic-type products such as toothpaste. Toothpaste is chemically quite active, and is generally considered difficult to hold in a package.

Attempts to package cyanoacrylate adhesives in the third type of tube containers were not successful with any of the conventionally known sheet materials used to make the laminated tubes. After being packaged in conventional tubes of the third type, the cyanoacrylate adhesive magrated through polymer layers to the foil layer. The tube delaminated between the foil layer and the adjacent polymer layer. The delaminated tube was not satisfactory for the package.

Cyanoacrylate also tends to cause swelling of polymers. In trials with some experimental multiple layer tubes, polymer layers disappeared as distinct layers, presumably having been either dissolved into the cyanoacrylate or otherwise absorbed into it.

It is an object of this invention to provide a packaging sheet material capable of holding cyanoacrylate-type products.

It is another object of this invention to provide such a sheet material which has excellent barrier to passage of matter through the sheet material.

It is yet another object to provide a package capable of holding a cyanoacrylate-type product.

SUMMARY OF THE INVENTION

These and other objects are achieved in a multiple layer sheet material having all the layers firmly adhered to each other. The sheet material has a first layer of high density polyethylene (HDPE), a second layer which may be a polymer or an adhesive, and a third primer layer of polyethylene imine (PEI). The third primer layer is between the first and second layers.

Regarding the layer compositions, each of the layers has preferred features which, while not critical to the invention, contribute to its efficiency or optimization. Thus, the resin density of the HDPE as determined by ASTM D-2839 is preferably at least 0.950. It should also preferably have a narrow molecular weight distribution and should be substantially free of amine components. Preferably its crystallinity is relatively high as developed in formation of that film-like layer.

The second layer may be any of a wide variety of functional materials which exhibit the desired properties. Preferred for the second layer is ethylene acrylic acid copolymer (EAA).

The primer in the third layer is preferably applied as a liquid solution containing a cross-linking type PEI.

Preferred embodiments of the sheet material include a fourth layer of metal foil so positioned in the structure that the second layer is between the third and fourth layers.

Finally, in most preferred embodiments, a fifth layer adheres a sixth layer, as of polyethylene, to the metal foil.

Another aspect of the invention is seen in a package which includes the novel packaging sheet material herein in the form of a package and a quantity of product therein where the product contains a substantial fraction of a cyanoacrylate-type component. The package is configured such that no edge of the sheet material is exposed to the product.

Still another aspect of the invention is seen in a package wherein the packaging sheet material has been modified by virtue of contact with cyanoacrylate-type components. In the modified form of the sheet material, the primer layer includes reacted components from the cyanoacrylate products.

DETAILED DESCRIPTION OF THE ILLUSTRATED EMBODIMENTS

Figure 1:
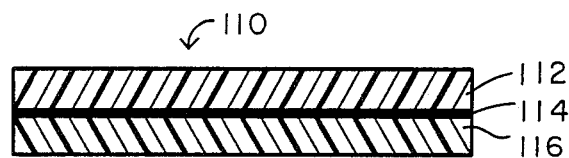
FIG. 1 is a cross-section of a three-layer sheet structure of this invention.

In FIG. 1 is shown a cross-section of a simple sheet structure 110 of the invention, including two polymeric layers 112 and 116 and a thin primer layer 114 therebetween. Layer 112 is HDPE. The composition of layer 116 is usually polymeric and may be chosen with substantial freedom. Layer 114 is a thin layer of primer.

In the numbering system, the first digit represents the FIGURE number. The second and third digits represent the element in the FIGURE. Common second and third digit numbers in the various FIGURES represent common elements. Thus 14 represents the primer layer in any of the FIGURES where it is shown. 114 represents the primer layer in only FIG. 1.

Figure 2:
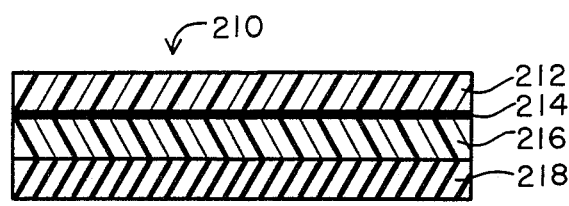
FIG. 2 is a cross-section of a four-layer sheet structure of this invention.

FIG. 2 shows a cross-section of a sheet structure 210 of the invention of intermediate complexity. Layer 212 is HDPE. Layer 214 is a thin primer layer. Layer 216 is an adhesive which is effective to adhere to a foil layer 218. With the introduction of the foil layer into the structure, the composition of adhesive layer 216 is selected such that it provides good adhesion between the foil layer 218 and the HDPE layer 212 through the primer 214. EAA is preferred for layer 216.

Figure 3:
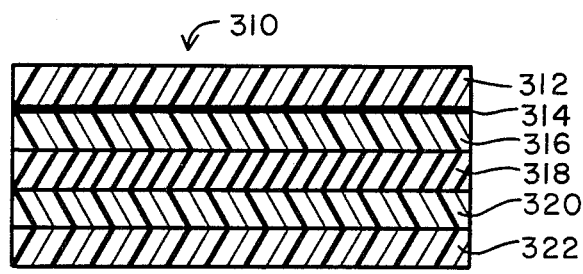
FIG. 3 is a cross-section of a six-layer sheet structure of this invention.

FIG. 3 shows a cross-section of a sheet structure 310 of the invention having more complexity than the structures of FIGS. 1 and 2, and also having more-preferred functional properties. Layers 312, 314, 316, and 318 are equivalent to the respective ones of those layers in FIG. 2. Layer 320 is an adhesive layer which adheres layer 322 to the foil layer 318. Layer 322 is protective of the foil layer and its composition is selected with that protection property as an important criteria.

Figure 4:
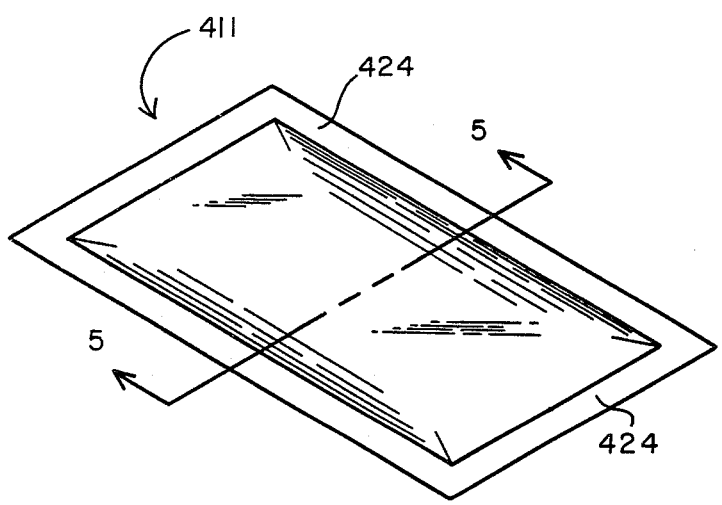
FIG. 4 is a pictorial view of an exemplary package of this invention, and including a cyanoacrylate-type product therein.

As stated earlier, cyanoacrylate is highly reactive as a chemical product. It is this strong tendency toward reaction that makes it so difficult to design a packaging material to hold it. It is further important that certain layers of the packaging material of this invention not be permitted to come into direct contact with the cyanoacrylate product. As it has been found that direct contact with cyanoacrylate can be tolerated by HDPE, it is preferred, and highly functional for the cyanoacrylate-type product to be in direct contact with only the HDPE layer in the finished packages of this invention. An acceptable package structure is a fin-sealed pouch 411 as seen in FIG. 4. The peripheral seals 424 are pointed out on 2 of the 4 sides of the pouch.

Figure 5:
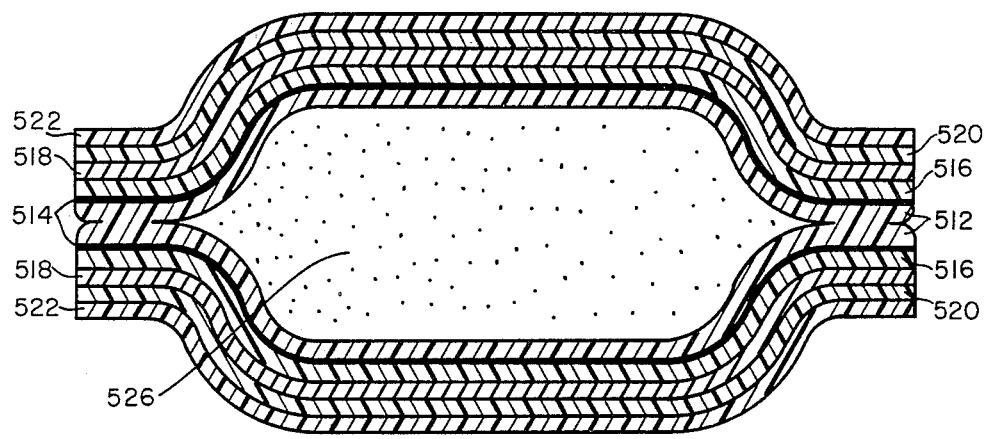
FIG. 5 is a greatly enlarged cross-section taken at 5—5 of FIG. 4, and showing the primer layers immediately after filling the package with product.

FIG. 5 shows a cross-section of the pouch of FIG. 4. Each of the layers 12, 14, 16, 18, 20, and 22 is shown in its overall relationship to the sheet structure, the package, and the product. It is seen that the fin-sealed type of construction ensures that the cyanoacrylate product has direct contact only with the HDPE layer. The FIG. 5 structure is accurately descriptive of the package at the time the product is put into the package.

As is illustrated in FIGS. 1, 2, 3, and 5, the primer layer 14 is extremely thin. It is important that the primer layer be continuous, in order to meet its minimum required functional parameter. Meeting the minimum required functional parameters, however, does not impose any minimum requirements for physical thickness of the primer layer beyond that required for continuity. The typical quantity of a PEI present in the sheet structure is of the order of 0.04 lbs. per 3000 square foot ream. In practice, the presence of layer 14 as a distinct layer is not visually detectable by normal microscopic examination of a cross-section of the sheet structure up to the time it is brought into contact with a cyanoacrylate-type product.

Figure 6:
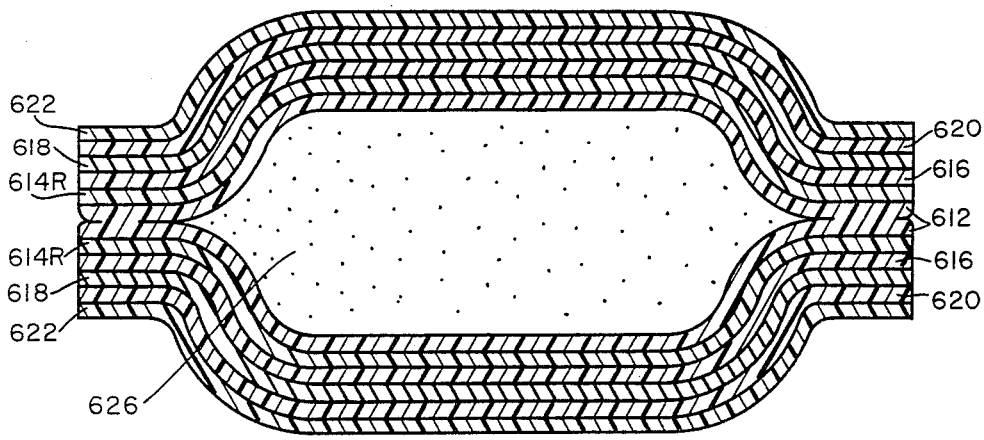
FIG. 6 is a greatly enlarged cross-section as in FIG. 5 shown after a long enough time that the primer layer has been modified and includes reacted components from the product.

FIG. 6 represents the cross-section as is FIG. 5, but after the cyanoacrylate product has been in the package for a while. The significant change is that a visible layer 614R has developed at layer 14, which was also the interface of layers 12 and 16 for appearance purposes when the sheet material was formed. For example, in packages evaluated after one week of storage at 120° F., the new layer as at 614R was 0.4 to 0.7 mil thick. Packages evaluated after four weeks of storage at 120° F. had layers 614R which were 0.9 to 1.6 mils thick. A primary component of the new layer 614R is reacted polymer of cyanoacrylate. Notably, the storage conditions cited herein are unusual in that they accelerate, in many respects, the normal process of aging for both the packaging material and the product. Thus, the tests iterated herein may represent the entire normal shelf life of the packaged product, or even beyond.

In some experimentally-made sheet materials which were otherwise the same as the sheet materials 10 of the invention, the primer layer 14 was not continuous, but unintentionally had small discontinuities of pin-hole size. Packages made with these sheet materials were not satisfactory. On inspection of the filled and sealed packages after a short storage period of 1 or 2 weeks, spot delaminations were unexpectedly observed. On detailed inspection, discontinuities were identified adjacent each spot delamination. The discontinuities were visible to microscopic inspection, in the reacted layer 614R. No spot delaminations were observed which could not be associated with a discontinuity. Thus the inventors have reached the conclusion that the primer layer 14 serves some function of the nature of impeding the migration of the cyanoacrylate product to the surface of the foil 18. It appears that the cyanoacrylate does penetrate, and pass through any discontinuity of the primer layer 14, to swell the layer 16, and react at the foil layer 18 to cause delamination. The inventors herein have concluded that the continuity of primer layer 14 is critical to operability of the invention. To that end, it is desirable to treat the surface of the HDPE layer, as necessary, such as by corona discharge, to ensure good wetting of the HDPE layer by the PEI when it is applied.

In certain cases, it may be desirable to have additional layers between HDPE layer 12 and the primer 14. Such additional layers may be used so long as any interaction they may have with, or as a result of, the product is acceptable and so long as the primer layer is continuous as described earlier and is separated from any foil layer by at least one intervening layer.

Experimentation has shown that, of the polyethylene imines available, the cross linking types are preferable over the non-crosslinking types. It is hypothesized that the PEI may act as a chemically basic electron donor material, and may interact with the product in polymerization, or other reaction of the cyanoacrylate product. Once the cyanoacrylate has reacted, the size of the reacted molecule is apparently such that it is no longer as mobile in the laminated sheet structure, and remains in the vicinity of the reaction site to form a part of the visible layer 14R. Based on the belief that the PEI acts as a catalytic electron donor, it is believed that other Lewis bases, such as amines and salts of weak acids, will function in a similar manner to impede migration of the product.

Figure 3A:
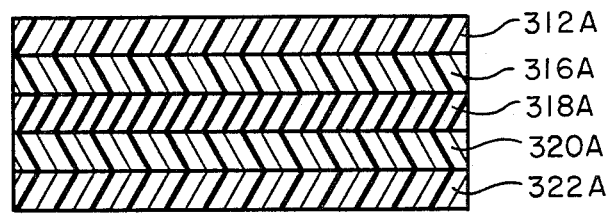
FIG. 3A is a cross-section of sheet structure not of this invention. It is similar to sheet structure of FIG. 3, except without the primer layer of FIG. 3.
Figure 3B:
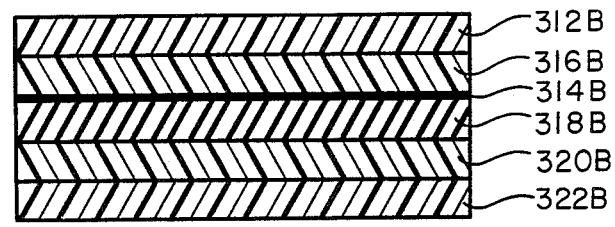
FIG. 3B is a cross-section of another sheet structure not of this invention. It is similar to sheet structure of FIG. 3 but has the primer layer in the wrong location.
Figure 3C:
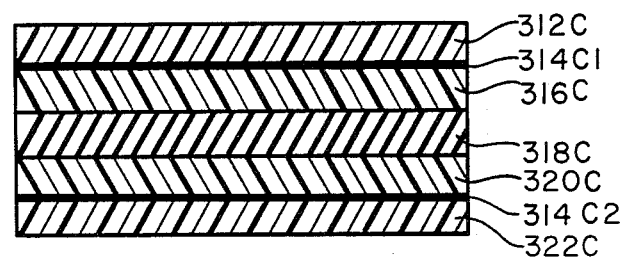
FIG. 3C is a cross-section of a sheet structure of the invention which has two primer layers.

Essentially, the presence of the primer layer 14 impedes migration of the cyanoacrylate through the structure past the primer layer. FIG. 3A represents a cross-section of sheet structure similar to the six layer structure of FIG. 3, but without the primer layer 14. Layers 312A, 316A, 318A, 320A and 322A all represent layers equivalent to the respective layers in the sheet structures of the invention. Without a primer layer 14, though, the sheet structure is not capable of satisfactorily holding cyanoacrylate-type products without significant deleterious affect on the packaging sheet structure. Typical affects are swelling of polymer layers and delamination. FIG. 3B represents a cross-section of sheet structure similar to the structure of FIG. 3, but with the primer layer 14 in the wrong place. Layers 312B, 314B, 316B, 318B, 320B, and 322B all represent layers equivalent to the respective layers in the sheet structure of the invention. Primer layer 14, however, is at the interface between the foil 18 and the EAA 16, rather than at the interface between the HDPE 12 and the EAA 16. With the primer thus improperly positioned, namely adjacent the foil rather than displaced from it, the sheet structure is not capable of satisfactorily holding cyanoacrylate-type products. Typical affects are swelling, especially layer 16, and delamination, particularly at the foil interface. Primers may be used elsewhere in the invention, as seen in FIG. 3C, so long as the primary layer of primer between layers 12 and 16 is retained. To that end layer 312C, 314C1, 316C, 318C, 320C, and 322C all represent layers equivalent to the respective layers in FIG. 3. Layer 314C2 is an additional primer layer which may, for example, be used to promote adhesion between layers 320C and 322C. This practice of using one or more additional primer layers, in addition to the primary primer layer at the interface of layers 12 and 16, is fully satisfactory so long as primary primer layer 14, as described herein, is displaced from the product and from the foil by at least one layer, and is between the product and the foil.

In general, of the polymers usually associated with good heat sealing capabilities, HDPE is the least affected by cyanoacrylate-type product. Other polymers are caused, by cyanoacrylate-type products, to swell by 50% to over 150%. As in the case of linear low density polyethylene copolymer (LLDPE), some polymeric materials are even absorbed into the product. While HDPE is also swelled somewhat, in the better HDPE's, the swelling is limited to only about 30%, and overall strength of the package is sustained satisfactorily. While most high density polyethylenes are acceptable, some are more preferred. The preferred polymers are characterized by the following properties. Resin density should be at least 0.950. The HDPE preferably has a narrow molecular weight distribution. A high degree of crystallinity in the HDPE layer is desirable, and can be somewhat controlled by the rate of cooling when the HDPE layer is formed by some melt forming process such as extrusion.

The critical elements of the invention are the HDPE layer 12 which serves as the sealant layer without being unacceptably affected by the cyanoacrylate product, and the primer layer 14. The presence of the primer layer at the disclosed location causes the mobility of the cyanoacrylate product to be impeded such that it does not readily pass through layer 14 and have harmful affect on the layers 16, 18, etc., which are beyond layers 12 and 14, as viewed from the layer 12 surface through the sheet material. Thus, the compositions of the various layers 16, 18, etc., beyond layer 14 may not need to be selected for their resistance to cyanoacrylate. Rather, they may be selected for their other desirable properties. Thus, layer 16 is defined rather broadly, as a polymer or an adhesive, and may be selected for the properties desired. In a three layer structure as in FIG. 1, layer 16 may, for example, conveniently be any polymer which adheres well to the primed side of the HDPE layer. Typical layer 16 polymers would be low density polyethylene (LDPE), HDPE, and propylene ethylene copolymer (PPE). Where a fourth layer is present in the sheet material, then the layer 16 must adhere well to it as well as to the interface at layers 12 and 14. In these structures, layer 16 may be considered to be a layer serving primarily an adhesive function. The adhesive layer may be a polymeric adhesive. Where the fourth layer is metal foil, an adhesive polymer such as EAA is known to adhere well to foil and is preferred for layer 16. Where the fourth layer 18 is polymeric, an adhesive polymer with graft substitutions of carboxy moieties such as maleic anhydride may be preferred. In some cases, adhesive emulsions may be used. In general, the selection of material for layer 16 depends on the definition of its function in the sheet structure, whether it be of a protective nature, as may be true in a three layer structure, or of an adhesive nature in structures having more than three layers.

The compositions, then, of layers 12 and 14 are selected with the primary purpose—in addition to their normal package structural functions—of controlling migration of the cyanoacrylate product through the sheet material. When properly selected and applied, they functionally control the migration of the cyanoacrylate through the sheet material, such that the compositions of all the other layers may be selected without primary consideration of their susceptibility to cyanoacrylate. Thus layer 18 is a metal foil layer which would be highly susceptible to loss of adhesion to polymers in the presence of cyanoacrylate-type products. Rather it is selected for its excellent properties as a barrier against passage of any matter through the package sheet material, into or out of the package. Other barrier materials may be used in the invention. Along with selection of the barrier material, if one is used, proper materials are selected from those known in the art, for the layers adjacent the barrier layer to ensure adhesion to, and compatibility with, the rest of the sheet structure. Exemplary of possible alternate barrier materials are vinylidene chloride copolymers, ethylene vinyl alcohol copolymers, and blends including major fractions of these.

Layer 16 is preferably EAA, another material susceptible of being greatly swelled by cyanoacrylate. But, with the protection provided by layers 12 and 14, the EAA is not thus disastrously affected by the product and may be selected for its excellent adhesive properties to the metal foil. Likewise layers 20 and 22 may also be selected without primary consideration of direct interaction with the product. By the same consideration, the layers 16 through 22, as well as additional layers may be selected with substantial freedom as long as the layers 12 and 14 serve a protective function between the layers 16 through 22 and the product.

The most preferred structure of the sheet material herein is that illustrated by FIGS. 3, 5, and 6. The sealant layer 12 and the primer layer 14 are narrow molecular weight HDPE and crosslinking PEI respectively. "Narrow molecular weight" is a relative term, used by the industry, that identifies the subject group of HDPE polymers by subjectively comparing their molecular weight disttibutions with those of other HDPE polymers. Layer 16 is EAA which serves as an adhesive to the metal foil barrier layer 18. Layer 20 is preferably EAA which serves as an adhesive between the foil layer 18 and layer 22 which is desirably a layer of polymer which is selected for either its excellent abuse resistance or its heat resistance. While a preferred composition for layer 22 is HDPE, other materials may be preferred for some uses. Exemplary of these are oriented polypropylene, oriented polyester, and oriented nylon. In some preferred embodiments, the layer 22 composition is LDPE. The composition of the adhesive layer 20 is selected in view of the selected compositions of both layers 18 and 22. Additional layers may be used as dictated by the situation, such as for printing, pigmenting, etc.

In order for the combined properties of the HDPE in layer 12 and the primer in layer 14 to provide protection for the other material layers in the sheet structure, namely protection from the cyanoacrylate product, it is important that the HDPE and PEI layers be interposed between the cyanoacrylate and the other layers at all areas where the cyanoacrylate is in contact with the packaging sheet material. Illustrative of this principle is a fin-sealed package as illustrated in FIGS. 4, 5, and 6. Formation of a finished package as shown in FIG. 4, from multiple layer sheet materials, is conventionally known in the industry. While the sheet structures disclosed herein are highly unusual, forming them into a finished package is relatively straight forward, as by means of conventionally forming heat seals about the periphery as shown in FIG. 4. The development of the visible layer 614R is, of course, highly novel and unexpected, and especially in its role in impeding penetration of cyanoacrylate into the rest of the packaging structure.

The process of making the sheet structure of the invention will now be discussed in terms of the preferred embodiments of the more complex structure; and it will be seen that the simpler structures are in some cases substructures thereof. The discussion of complex structures as in FIG. 3, thus, also includes the general types of processes which are used to make the simpler 3 or 4 layer structures.

In the first operation, a layer of HDPE is formed, as by an extrusion process. The process is designed for relatively slow cooling of the extruded HDPE layer in order to encourage development of crystallinity. A preferred process is tubular blown extrusion. Another acceptable process is cast extrusion where the sheet is cast onto a relatively warm roll and where the elevated temperatures are held over a period of time, down stream of the extrusion, which is conducive to development of crystallinity. The HDPE layer is then preferably corona treated to a level of at least 38 dynes/cm. of surface energy. The treated side of the HDPE is then primed with a PEI primer solution and dried, leaving a continuous layer of PEI on the surface of the HDPE. The primed side of the HDPE layer is then extrusion laminated to aluminum foil using EAA as the extrusion laminant. The structure at this state is represented by FIG. 2. The structure as represented by FIG. 3 is completed by extrusion laminating a previously formed abuse resistant layer, such as HDPE, to the exposed side of the foil, using EAA as the extrusion laminant.

If desired, the sheet material may then be reacted with cyanoacrylate moieties, to form a sheet material having a reacted primer layer 14R, before forming it into a package structure as in FIG. 4. The reaction may be carried out by contacting the HDPE layer 12 with the cyanoacrylate moieties.

In making the 3-layer structure, represented by FIG. 1, the HDPE layer is formed, treated and primed as previously discussed. Layer 16 is then added by an appropriate process. A typical process is extrusion coating of the appropriate material onto the primed surface. In another exemplary process, layer 16 is formed in a separate operation and is joined to primer layer 14 by heat and pressure lamination at a hot nip, or may be extrusion laminated to layer 14 by using an intervening layer of an extrusion laminant.

Thus it is seen that the invention provides a packaging sheet material capable of holding cyanoacrylate-type products. It further provides a sheet material which has excellent barrier properties to passage of matter through the sheet material. Even more significantly, the invention provides a sheet material which can be made into a closed and sealed package capable of holding a cyanoacrylate-type product.

The sheet materials of this invention are also, of course, capable of holding products which have lower chemical activity than cyanoacrylate. In those cases, materials which are less preferred for holding cyanoacrylate may be more desirable because of other advantages such as economics or processing advantages.

Having thus described the invention, what is claimed is:

1. A multiple layer sheet material wherein all the layers are firmly adhered to each other, said sheet material comprising:
   (a) a first layer of high density polyethylene;
   (b) a second layer, the composition of said second layer being chosen from the group consisting of polymers and adhesives;
   (c) a third primer layer, the composition of said primer layer being made from polyethylene imine and components of a cyanoacrylate material, said third layer being between said first and second layers, and wherein, when said composition of said second layer is polymeric, and comprises an outer layer of said sheet material, said second layer is protective of said primer layer, and wherein, when said composition is an adhesive, said second layer has two opposing surfaces and adheres a fourth layer to said sheet structure on the one of said surfaces of said second layer which is opposite said primer layer.

2. A multiple layer sheet material as in claim 1 wherein said high density polyethylene of said first layer has a narrow molecular weight distribution.

3. A multiple layer sheet material as in claim 1 wherein said first layer of high density polyethylene is substantially free of amine components.

4. A multiple layer sheet material as in claim 2 wherein said first layer of high density polyethylene is substantially free of amine components.

5. A multiple layer sheet material as in claim 1 wherein said first layer of high density polyethylene has a relatively high degree of crystallinity.

6. A multiple layer sheet material as in claim 2 wherein said first high density polyethylene layer has a relatively high degree of crystallinity.

7. A multiple layer sheet material as in claim 3 wherein said first high density polyethylene layer has a relatively high degree of crystallinity.

8. A multiple layer sheet material as in claim 4 wherein said first high density polyethylene layer has a relatively high degree of crystallinity.

9. A multiple layer sheet material as in claim 1 wherein said polyethylene imine of said third layer is derived from a liquid solution containing a cross-linkable polyethylene imine.

10. A multiple layer sheet material as in claim 2 wherein said polyethylene imide of said third layer is derived from a liquid solution containing a cross-linkable polyethylene imine.

11. A multiple layer sheet material as in claim 3 wherein said polyethylene imine of said third layer is derived from a liquid solution containing a cross-linkable polyethylene imine.

12. A multiple layer sheet material as in claim 4 wherein said polyethylene imine of said third layer is derived from a liquid solution containing a cross-linkable polyethylene imine.

13. A multiple layer sheet material as in claim 5 wherein said polyethylene imine of said third layer is derived from a liquid solution containing a cross-linkable polyethylene imine.

14. A multiple layer sheet material as in claim 6 wherein said polyethylene imine of said third layer is derived from a liquid solution containing a cross-linkable polyethylene imine.

15. A multiple layer sheet material as in claim 7 wherein said polyethylene imine of said third layer is derived from a liquid solution containing a cross-linkable polyethylene imine.

16. A multiple layer sheet material as in claim 8 wherein said polyethylene imine of said third layer is derived from a liquid solution containing a cross-linkable polyethylene imine.

17. A multiple layer sheet material as in claim 1 wherein the composition of said second layer comprises an adhesive polymer, and wherein said sheet material further comprises a fourth layer of metal foil and wherein said second layer is between said third and fourth layers.

18. A multiple layer sheet material as in claim 2 wherein the composition of said second layer comprises an adhesive polymer, and wherein said sheet material further comprises a fourth layer of metal foil and wherein said second layer is between said third layer and said fourth layer.

19. A multiple layer sheet material as in claim 15 wherein the composition of said second layer comprises an adhesive polymer, and wherein said sheet material further comprises a fourth layer of metal foil and wherein said second layer is between said third layer and said fourth layer.

20. A multiple layer sheet material as in claim 16 wherein the composition of said second layer comprises an adhesive polymer, and wherein said sheet material further comprises a fourth layer of metal foil and wherein said second layer is between said third layer and said fourth layer.

21. A multiple layer sheet material as in claim 17 wherein said first layer of high density polyethylene is substantially free of amine components.

22. A multiple layer sheet material as in claim 18 wherein said first layer of high density polyethylene is substantially free of amine components.

23. A multiple layer sheet material as in claim 17 wherein the composition of said second layer comprises ethylene acrylic acid copolymer.

24. A multiple layer sheet material as in claim 18 wherein the composition of said second layer comprises ethylene acrylic acid copolymer.

25. A multiple layer sheet material as in claim 19 wherein the composition of said second layer comprises ethylene acrylic acid copolymer.

26. A multiple layer sheet material as in claim 20 wherein the composition of said second layer comprises ethylene acrylic acid copolymer.

27. A multiple layer sheet material as in claim 21 wherein the composition of said second layer comprises ethylene acrylic acid copolymer.

28. A multiple layer sheet material as in claim 22 wherein the composition of said second layer comprises ethylene acrylic acid copolymer.

29. A multiple layer sheet material as in claim 17 and including a fifth layer adhering a sixth layer of polyethylene to said fourth layer of metal foil.

30. A multiple layer sheet material as in claim 18 and including a fifth layer adhering a sixth layer of polyethylene to said fourth layer of metal foil.

31. A multiple layer sheet material as in claim 19 and including a fifth layer adhering a sixth layer of polyethylene to said fourth layer of metal foil.

32. A multiple layer sheet material as in claim 20 and including a fifth layer adhering a sixth layer of polyethylene to said fourth layer of metal foil.

33. A multiple layer sheet material as in claim 21 and including a fifth layer adhering a sixth layer of polyethylene to said fourth layer of metal foil.

34. A multiple layer sheet material as in claim 22 and including a fifth layer adhering a sixth layer of polyethylene to said fourth layer of metal foil.

35. A multiple layer sheet material as in claim 23 and including a fifth layer adhering a sixth layer of polyethylene to said fourth layer of metal foil.

36. A multiple layer sheet material as in claim 24 and including a fifth layer adhering a sixth layer of polyethylene to said fourth layer of metal foil.

37. A multiple layer sheet material as in claim 25 and including a fifth layer adhering a sixth layer of polyethylene to said fourth layer of metal foil.

38. A multiple layer sheet material as in claim 26 and including a fifth layer adhering a sixth layer of polyethylene to said fourth layer of metal foil.

39. A multiple layer sheet material as in claim 27 and including a fifth layer adhering a sixth layer of polyethylene to said fourth layer of metal foil.

40. A multiple layer sheet material as in claim 28 and including a fifth layer adhering a sixth layer of polyethylene to said fourth layer of metal foil.

41. A multiple layer sheet material wherein the layers are firmly adhered to each other, said sheet material comprising, in order:
(a) a first layer of polyethylene having a resin density of at least 0.950, having a narrow molecular weight distribution, and being substantially free of amine components;
(b) a second primer layer of polyethylene imine on one surface of said first layer;
(c) a third layer of ethylene acrylic acid copolymer on said second primer layer; and
(d) a fourth layer of metal foil on said third layer.

42. A multiple layer sheet material as in claim 41 and wherein said first layer has a relatively high degree of crystallinity.

43. A multiple layer sheet material wherein all the layers are firmly adhered to each other, said sheet material comprising:
   (a) a first layer of high density polyethylene;
   (b) a second layer, the composition of said second layer being chosen from the group consisting of polymers and adhesives; and
   (c) a third primer layer, the composition of said primer layer comprising a major fraction of a Lewis base;
said third layer being between said first and second layers.

44. A multiple layer sheet material as in claim 43 wherein the composition of said second layer comprises ethylene acrylic acid copolymer, said second layer having two opposing surfaces and adhering a fourth layer in said sheet material on the one of said surfaces of said second layer which is opposite said third primer layer.

45. A multiple layer sheet material, comprising:
   (a) a first layer of polyethylene having a resin density of at least 0.950, having a narrow molecular weight distribution, and being substantially free of amine components;
   (b) a second layer, the composition of said second layer being chosen from the group consisting of polymers and adhesives; and
   (c) a third primer layer, said third layer having been made from a Lewis base and components from a cyanoacrylate material, said third layer being between said first and second layers,
and wherein, when said composition of said second layer is polymeric, and comprises an outer layer in said sheet material, said second layer is protective of said primer layer, and wherein, when said composition of said second layer is an adhesive, said second layer has two opposing surfaces and adheres a fourth layer in said sheet material on the one of said surfaces of said second layer which is opposite said primer layer.

46. A multiple layer sheet material as in claim 45 wherein said Lewis base is polyethylene imine.

47. A multiple layer sheet material as in claim 45 wherein the composition of said second layer is ethylene acrylic acid copolymer, and wherein said sheet material further comprises a fourth layer of metal foil and wherein said second layer is between said third layer and said fourth layer.

48. A multiple layer sheet material as in claim 47 wherein said Lewis base is polyethylene imine.

49. A multiple layer sheet material as in claim 48 and including a fifth layer adhering a sixth layer to said fourth layer of metal foil.

50. A multiple layer sheet material as in claim 49 wherein the composition of said sixth layer is chosen from the group consisting of oriented polypropylene, oriented polyester, and oriented nylon.

51. A multiple layer sheet material as in claim 45 and including a fourth layer of metal foil, said second layer being between said third and fourth layers, and a fifth layer adhering a sixth layer to said fourth layer of metal foil, said sixth layer being an abuse resistant polymer.

52. A multiple layer sheet material as in claim 51 wherein the composition of said sixth layer is chosen from the group consisting of oriented polyester, oriented polypropylene, and oriented nylon.

53. A multiple layer sheet material as in claim 43 wherein said Lewis base is polyethylene imine.

54. A multiple layer sheet material as in claim 43 wherein the composition of said second layer is ethylene acrylic acid copolymer, and wherein said sheet material further comprises a fourth layer of metal foil and wherein said second layer is between said third layer and said fourth layer.

55. A multiple layer sheet material as in claim 54 wherein said Lewis base is polyethylene imine.

56. A multiple layer sheet material as in claim 55 and including a fifth layer adhering a sixth layer to said fourth layer of metal foil.

57. A multiple layer sheet material as in claim 56 wherein the composition of said sixth layer is chosen from the group consisting oriented polypropylene, oriented polyester, and oriented nylon.

58. A multiple layer sheet material as in claim 43 and including a fourth layer of metal foil, said second layer being between said third and fourth layers, and a fifth layer adhering a sixth layer to said fourth layer of metal foil, said sixth layer being an abuse resistant polymer.

59. A multiple layer sheet material as in claim 58 wherein the composition of said sixth layer is chosen from the group consisting of oriented polyester, oriented polypropylene, and oriented nylon.

60. A multiple layer sheet material wherein all the layers are firmly adhered to each other, said sheet material comprising:
   (a) a first layer of high density polyethylene;
   (b) a second layer, the composition of said second layer being chosen from the group consisting of polymers and adhesives; and
   (c) a third primer layer, the composition of said primer layer having been made from a primer comprising a major fraction of a Lewis base and components of a cyanoacrylate material;
said third layer being between said first and second layers, and wherein, when said composition of said second layer is polymeric, and comprises an outer layer in said sheet material, said second layer is protective of said primer layer, and wherein, when said composition of said second layer is an adhesive, said second layer has two opposing surfaces and adheres a fourth layer in said sheet material on the one of said surfaces of said second layer which is opposite said primer layer.

61. A multiple layer sheet material as in claim 60 wherein said Lewis base is polyethylene imine.

62. A multiple layer sheet material as in claim 60 wherein the composition of said second layer is ethylene acrylic acid copolymer, and wherein said sheet material further comprises a fourth layer of metal foil and wherein said second layer is between said third layer and said fourth layer.

63. A multiple layer sheet material as in claim 62 wherein said Lewis base is polyethylene imine.

64. A multiple layer sheet material as in claim 63 and including a fifth layer adhering a sixth layer to said fourth layer of metal foil.

65. A multiple layer sheet material as in claim 64 wherein the composition of said sixth layer is chosen from the group consisting of oriented polypropylene, oriented polyester, and oriented nylon.

66. A multiple layer sheet material as in claim 60 and including a fourth layer of metal foil, said second layer being between said third and fourth layers, and a fifth layer adhering a sixth layer to said fourth layer of metal foil, said sixth layer being an abuse resistant polymer.

67. A multiple layer sheet material as in claim 66 wherein the composition of said sixth layer is chosen from the group consisting of oriented polyester, oriented polypropylene, and oriented nylon.

68. A multiple layer sheet material, comprising:
(a) a first layer of polyethylene having a resin density of at least 0.950, having a narrow molecular weight distribution, and being substantially free of amine components;
(b) a second layer, the composition of said second layer being chosen from the group consisting of polymers and adhesives; and
(c) a third primer layer, said third layer having been made from a primer comprising a major fraction of a Lewis base and components from a cyanoacrylate material, said third layer being between said first and second layers, and wherein, when said composition of said second layer is polymeric, and comprises an outer layer in said sheet material, said second layer is protective of said primer layer, and wherein, when said composition of said second layer is an adhesive, said second layer has two opposing surfaces and adheres a fourth layer in said sheet material on the one of said surfaces of said second layer which is opposite said primer layer.

69. A multiple layer sheet material as in claim 68 wherein said Lewis base is polyethylene imine.

70. A multiple layer sheet material as in claim 68 wherein the composition of said second layer is ethylene acrylic acid copolymer, and wherein said sheet material further comprises a fourth layer of metal foil and wherein said second layer is between said third layer and said fourth layer.

71. A multiple layer sheet material as in claim 70 wherein said Lewis base is polyethylene imine.

72. A multiple layer sheet material as in claim 71 and including a fifth layer adhering a sixth layer to said fourth layer of metal foil.

73. A multiple layer sheet material as in claim 72 wherein the composition of said sixth layer is chosen from the group consisting of oriented polypropylene, oriented polyester, and oriented nylon.

74. A multiple layer sheet material as in claim 68 and including a fourth layer of metal foil, said second layer being between said third and fourth layers, and a fifth layer adhering a sixth layer to said fourth layer of metal foil, said sixth layer being an abuse resistant polymer.

75. A multiple layer sheet material as in claim 74 wherein the composition of said sixth layer is chosen from the group consisting of oriented polyester, oriented propylene, and oriented nylon.

76. A multiple layer sheet material wherein all the layers are firmly adhered to each other, said sheet material consisting essentially of:
(a) a first layer of high density polyethylene;
(b) a second layer, the composition of said second layer being chosen from the group consisting of polymers and adhesives;
(c) a third primer layer, the composition of said primer layer having been made from a combination of (i) a primer comprising a major fraction of a Lewis base and (ii) components of a cyanoacrylate material; and
(d) a fourth layer, when said second layer is an adhesive, said third layer being between said first and second layers, and wherein, when said composition of said second layer is polymeric, and comprises an outer layer of said sheet material, said second layer is protective of said primer layer, and wherein, when said composition of said second layer is an adhesive, said second layer has two opposing surfaces and adheres said fourth layer in said sheet material on the one of said surfaces of said second layer which is opposite said primer layer.

77. A multiple layer sheet material as in claim 76 wherein said Lewis base is polyethylene imine.

78. A multiple layer sheet material consisting essentially of:
(a) a first layer of polyethylene having a resin density of at least 0.950, having a narrow molecular weight distribution, and being substantially free of amine components;
(b) a second layer, the composition of said second layer being chosen from the group consisting of polymers and adhesives;
(c) a third primer layer, said third layer having been made from a combination of (i) a Lewis base and (ii) components from a cyanoacrylate material, said third layer being between said first and second layers; and
(d) a fourth layer, when said second layer is an adhesive, and wherein, when said composition of said second layer is polymeric, and comprises an outer layer of said sheet material, said second layer is protective of said primer layer, and wherein, when said composition of said second layer is an adhesive, said second layer has two opposing surfaces and adheres said fourth layer in said sheet material on the one of said surfaces of said second layer which is opposite said primer layer.

79. A multiple layer sheet material as in claim 78 wherein said Lewis base is polyethylene imine.

80. A multiple layer sheet material wherein all the layers are firmly adhered to each other, said sheet material comprising:
(a) a first layer of high density polyethylene;
(b) a second layer of an abuse resistant polymer; and
(c) a third primer layer, the composition of said primer layer comprising a major fraction of a Lewis base, said third layer being between said first and second layers.

81. A multiple layer sheet material as in claim 80 wherein said Lewis base is polyethylene imine.

82. A multiple layer sheet material as in claim 80 and including a fourth barrier layer between said second and third layers.

83. A multiple layer sheet material as in claim 81 and including a fourth barrier layer between said second and third layers.

84. A multiple layer sheet material wherein all the layers are firmly adhered to each other, said sheet material comprising:
(a) a first layer of high density polyethylene;
(b) a second layer of a heat resistant polymer; and
(c) a third primer layer, the composition of said primer layer comprising a major fraction of a Lewis base, said third layer being between said first and second layers.

85. A multiple layer sheet material as in claim 82 and including a fifth adhesive layer between said third layer and said fourth layer.

86. A multiple layer sheet material as in claim 84 and including a fourth barrier layer between said second and third layers.

87. A multiple layer sheet material as in claim 83 and including a fifth adhesive layer between said third layer and said fourth layer.

88. A multiple layer sheet material as in claim 84 wherein said Lewis base is polyethylene imine.

89. A multiple layer sheet material as in claim 86 and including a fifth adhesive layer between said third layer and said fourth layer.

90. A multiple layer sheet material as in claim 84 and including a fourth barrier layer between said second and third layers.

91. A multiple layer sheet material as in claim 90 and including a fifth adhesive layer between said third layer and said fourth layer.

92. A multiple layer sheet material wherein all the layers are firmly adhered to each other, said sheet material comprising:
(a) a first layer of high density polyethylene;
(b) a second layer;
(c) a third primer layer of polyethylene imine, said third primer layer being between said first and second layers; and
(d) a fourth layer of metal foil, wherein said second layer is between said third and fourth layers, said second layer having a composition functionally capable of performing an adhesive function.

93. A multiple layer sheet material as in claim 92 wherein said first layer of high density polyethylene has a narrow molecular weight distribution.

94. A multiple layer sheet material as seen in claim 92 wherein said polyethylene imine of said third layer is derived from a liquid solution containing a cross-linking type of polyethylene imine, and wherein said first high density polyethylene layer has a relatively high degree of crystallinity and is substantially free of amine components.

95. A multiple layer sheet material as in claim 94 wherein said high density polyethylene of said first layer has a narrow molecular weight distribution.

96. A multiple layer sheet material as in claim 92 wherein said first layer of high density polyethylene is substantially free of amine components.

97. A multiple layer sheet material as in claim 93 wherein said first layer of high density polyethylene is substantially free of amine components.

98. A multiple layer sheet material as in claim 92 wherein the composition of said second layer comprises ethylene acrylic acid copolymer.

99. A multiple layer sheet material as in claim 93 wherein the composition of said second layer comprises ethylene acrylic acid copolymer.

100. A multiple layer sheet material as in claim 94 wherein the composition of said second layer comprises ethylene acrylic acid copolymer.

101. A multiple layer sheet material as in claim 95 wherein the composition of said second layer comprises ethylene acrylic acid copolymer.

102. A multiple layer sheet material as in claim 96 wherein the composition of said second layer comprises ethylene acrylic acid copolymer.

103. A multiple layer sheet material as in claim 97 wherein the composition of said second layer comprises ethylene acrylic acid copolymer.

104. A multiple layer sheet material as in claim 92 and including a fifth layer adhering a sixth layer of polyethylene to said fourth layer of metal foil.

105. A multiple layer sheet material as in claim 93 and including a fifth layer adhering a sixth layer of polyethylene to said fourth layer of metal foil.

106. A multiple layer sheet material as in claim 94 and including a fifth layer adhering a sixth layer of polyethylene to said fourth layer of metal foil.

107. A multiple layer sheet material as in claim 95 and including a fifth layer adhering a sixth layer of polyethylene to said fourth layer of metal foil.

108. A multiple layer sheet material as in claim 96 and including a fifth layer adhering a sixth layer of polyethylene to said fourth layer of metal foil.

109. A multiple layer sheet material as in claim 97 and including a fifth layer adhering a sixth layer of polyethylene to said fourth layer of metal foil.

110. A multiple layer sheet material as in claim 98 and including a fifth layer adhering a sixth layer of polyethylene to said fourth layer of metal foil.

111. A multiple layer sheet material as in claim 99 and including a fifth layer adhering a sixth layer of polyethylene to said fourth layer of metal foil.

112. A multiple layer sheet material as in claim 100 and including a fifth layer adhering a sixth layer of polyethylene to said fourth layer of metal foil.

113. A multiple layer sheet material as in claim 101 and including a fifth layer adhering a sixth layer of polyethylene to said fourth layer of metal foil.

114. A multiple layer sheet material as in claim 102 and including a fifth layer adhering a sixth layer of polyethylene to said fourth layer of metal foil.

115. A multiple layer sheet material as in claim 103 and including a fifth layer adhering a sixth layer of polyethylene to said fourth layer of metal foil.

116. A multiple layer sheet material wherein all the layers are firmly adhered to each other, said sheet material consisting essentially of:
(a) a first layer of high density polyethylene;
(b) a second layer, the composition of said second layer being chosen from the group consisting of polymers and adhesives; and
(c) a third primer layer, the composition of said primer layer comprising a major fraction of a Lewis base;

said third layer being between said first and second layers.

117. A multiple layer sheet material wherein all the layers are firmly adhered to each other, said sheet material comprising:
(a) a first layer of high density polyethylene;
(b) a second layer, the composition of said second layer being chosen from the group consisting of polymers and adhesives;
(c) a third primer layer, the composition of said primer layer having been made from a combination of (i) a primer comprising a major fraction of a Lewis base and (ii) components of a cyanoacrylate material; and
(d) a fourth layer, wherein said second layer is an adhesive, said third layer being between said first and second layers, and wherein, when said composition of said second layer is polymeric, and comprises an outer layer of said sheet material, said second layer is protective of said primer layer, and wherein, when said composition of said second layer is an adhesive, said second layer has two opposing surfaces and adheres said fourth layer in said sheet material on the one of said surfaces of said second layer which is opposite said primer layer.

* * * * *